United States Patent
Miyazaki et al.

(10) Patent No.: US 10,018,990 B2
(45) Date of Patent: Jul. 10, 2018

(54) NUMERICAL CONTROLLER INCLUDING DNC OPERATION UNIT

(71) Applicant: FANUC Corporation, Minamitsuru-gun, Yamanashi (JP)

(72) Inventors: Yoshito Miyazaki, Yamanashi (JP); Hiroshige Ando, Yamanashi (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 245 days.

(21) Appl. No.: 14/798,718

(22) Filed: Jul. 14, 2015

(65) Prior Publication Data
US 2016/0033956 A1   Feb. 4, 2016

(30) Foreign Application Priority Data

Jul. 30, 2014   (JP) ................ 2014-154975

(51) Int. Cl.
*G06F 19/00*   (2018.01)
*G05B 19/408*   (2006.01)

(52) U.S. Cl.
CPC .. *G05B 19/408* (2013.01); *G05B 2219/34376* (2013.01)

(58) Field of Classification Search
CPC .................................................. G05B 19/408
USPC ............................................ 700/157
See application file for complete search history.

(56) References Cited

U.S. PATENT DOCUMENTS

| 5,930,141 A | 7/1999 | Kamiyama et al. |
| 2004/0034443 A1 | 2/2004 | Hosokawa et al. |
| 2006/0149411 A1* | 7/2006 | Kochiya ............ G05B 19/4067 700/160 |
| 2008/0294877 A1* | 11/2008 | Haga ................. G05B 19/4155 712/216 |

(Continued)

FOREIGN PATENT DOCUMENTS

| DE | 102011089791 A1 | 7/2012 |
| JP | S61-245207 A | 10/1986 |

(Continued)

OTHER PUBLICATIONS

Decision to Grant a Patent dated Dec. 6, 2016 in Japanese Patent Application No. 2014-154975 (3 pages) with an English Translation (3 pages).

(Continued)

*Primary Examiner* — Mohammad Ali
*Assistant Examiner* — Md Azad
(74) *Attorney, Agent, or Firm* — Drinker Biddle & Reath LLP

(57) ABSTRACT

In a numerical controller including a DNC operation unit, an automatic operation execution unit includes a buffering completion checking result holding unit for checking whether a portion of a machining program to be buffered includes a buffering point, an execution checking result holding unit for checking whether a portion of the machining program to be executed includes a buffering point, a comparison unit for comparing the buffering completion checking result holding unit with the execution checking result holding unit, and an execution unit for performing any one of continuation, suspension, and resumption of the automatic operation based on a result of the comparison.

13 Claims, 12 Drawing Sheets

(56) References Cited

U.S. PATENT DOCUMENTS

| | | | |
|---|---|---|---|
| 2011/0093666 A1* | 4/2011 | Endo | G05B 19/4155 |
| | | | 711/154 |
| 2013/0110521 A1 | 5/2013 | Hwang et al. | |
| 2014/0088755 A1* | 3/2014 | Haga | G05B 19/408 |
| | | | 700/190 |
| 2014/0316536 A1* | 10/2014 | Nakajima | G05B 19/18 |
| | | | 700/11 |

FOREIGN PATENT DOCUMENTS

| | | |
|---|---|---|
| JP | H05-313726 A | 11/1993 |
| JP | H07-239707 A | 9/1995 |
| JP | H09-179621 A | 7/1997 |
| JP | 2003-195930 A | 7/2003 |
| JP | 2004-078476 A | 3/2004 |
| JP | 2005-135153 A | 5/2005 |
| JP | 2009-181174 A | 8/2009 |
| JP | 2015-501450 A | 1/2015 |

OTHER PUBLICATIONS

Office Action dated Apr. 5, 2018, in German Patent Application No. 10 2015 009 583.8 (7 pages) with an English Translation (7 pages).

* cited by examiner

```
O0001;
N001 G01 X100 Z302 S100;
N002 X102 Z305;
  :   :   :
N011 G00 X400 Z500 M1000;
N012 G01 X400 Z502;
N013 X402 Z505;
  :   :   :
N020 G00 X100 Z300 M1000;
  :
M30;
```

NUMERICAL CONTROLLER INCLUDING DNC OPERATION UNIT

RELATED APPLICATION DATA

This application claims priority under 35 U.S.C. § 119 and/or § 365 to Japanese Application No. 2014-154975 filed Jul. 30, 2014, the entire contents is incorporated herein by reference.

BACKGROUND OF THE INVENTION

1. Field of the Invention

The present invention relates to a numerical controller and more particularly to a numerical controller that controls timing of reading and buffering of a machining program and timing of operation execution based on the machining program if the transfer rate of the machining program is low.

2. Description of the Related Art

A numerical controller loads a machining program held in an internal memory and performs automatic operation. Recent spread of CAD/CAM systems allows creation of a machining program which achieves a complicated free-form surface machining shape through interpolation with minute line segments, which makes machining programs increasingly huge. In order for a numerical controller to execute a huge machining program, an internal memory needs to be increased in capacity. The increase in capacity of the internal memory leads to an increase in cost and a reduction in speed and has limitations.

A storage medium as an auxiliary storage, such as a commercially available floppy (registered trademark) disk drive or a CompactFlash (registered trademark) card, can be connected to a numerical controller, and a machining program can be stored in the storage medium (see, e.g., Japanese Patent Application Laid-Open No. 2005-135153). There is commonly known direct numerical control (DNC) operation that performs operation while reading out a machining program saved in an auxiliary storage as described above as a way to supplement an internal memory with limited capacity (see, e.g., Japanese Patent Application Laid-Open No. 2004-078476).

There is also known DNC operation in a configuration in which a computer as a host and a numerical controller are communicatively connected. In the DNC operation, machining program data transferred from the host via communication tool is accumulated in a file device or a memory of the numerical controller, and the numerical controller controls machining using the accumulated machining program data (see, e.g., Japanese Patent Application Laid-Open No. 2003-195930).

A readout time period in readout of a machining program in DNC operation as described earlier is longer than that in readout from an internal memory of a numerical controller, regardless of readout from an auxiliary storage or transfer from a host. This generally increases a machining time period. In order to prevent an increase in machining time period, operation may be performed with block-by-block processing of machining program data accumulated in an internal memory of a numerical controller while a result of readout from an auxiliary storage or a host is accumulated in the memory. As such a function, Japanese Patent Application Laid-Open No. 07-239707 introduces a remote operation function of sequentially taking out machining program data in an operation buffer in a memory block by block to perform operation while accumulating machining program data transferred from a host to a numerical controller in the operation buffer.

FIG. 13 is a remote operation process block diagram of a numerical controller 100 having a remote operation function in Japanese Patent Application Laid-Open No. 07-239707. Machining program data PD transferred from a host 200 is transferred to an operation buffer 150 via a communication control unit 140 of the numerical controller 100. The machining program data PD transferred to the operation buffer 150 is taken out into a block analysis unit 110 block by block, and taken-out blocks are sequentially analyzed. Each analysis result SR is passed to a block execution unit 120, and machining is executed.

FIG. 14 is a block diagram of a remote operation function of reading out machining program data from an auxiliary storage 300 instead of transferring machining program data from the host 200. FIG. 14 is the same as FIG. 13 except that machining program data PD to the operation buffer 150 is transferred from the auxiliary storage 300.

A numerical controller having a remote operation function as described earlier suffers from the problem below. If a process of transferring blocks of machining program data transferred from a host or an auxiliary storage to an operation buffer is slower than a process of taking out machining program data by a block analysis unit and a block execution unit, the operation buffer may become empty to stop machining, and a cutter mark may be made in a workpiece or vibration may occur.

To cope with the problem, Japanese Patent Application Laid-Open No. 07-239707 discloses a method that involves avoiding cutter mark making or vibration due to stoppage of machining by reducing a cutting feed rate if the amount of data left of machining program data in an operation buffer falls below a predetermined block number.

However, there is generally no guarantee of an upper limit for a time period for readout from an auxiliary storage. Since transfer from a host to a numerical controller generally depends on host or network congestion, an upper limit for a time period for transfer cannot be generally guaranteed, like a time period for readout from an auxiliary storage. For this reason, use of the method disclosed in Japanese Patent Application Laid-Open No. 07-239707 suffers from the problem below. It is unclear how much a cutting feed rate is to be actually reduced to avoid emptiness in an operation buffer.

Japanese Patent Application Laid-Open No. 07-239707 also discloses a solution, i.e., the idea of preventing cutter mark making or vibration by making a tool during cutting retreat in an axial direction in which the tool is attached even in a worst case where an operation buffer becomes empty. The operation of making a tool during cutting feed to retreat and then returning the tool causes a problem in the quality of a machining surface and is not applicable to finishing or the like. Thus, problems cannot be said to be solved. Additionally, in Japanese Patent Application Laid-Open No. 07-239707, whether to enable the tool retreat function as described earlier can be set. Japanese Patent Application Laid-Open No. 07-239707, however, also suffers from the problem below. If a machining program in an operation buffer actually becomes empty in a portion for which the tool retreat function is disabled, cutter mark making or vibration cannot be prevented.

In addition, in Japanese Patent Application Laid-Open No. 07-239707, the percentage of reduction in cutting feed rate (a cutting feed override), whether to reduce the rate, whether to enable the tool retreat function, and the like are specified in a statement of a machining program. If a machining program is long, to edit the details of the entire area of the machining program so as to change such settings on an as-needed basis takes effort and is not practical.

SUMMARY OF THE INVENTION

An object of the present invention is to provide a numerical controller capable of controlling timing of readout and buffering of a machining program and timing of operation execution based on the machining program if the transfer rate of the machining program is low.

A numeral controller including a DNC operation unit according to the present invention is a numerical controller which buffers a machining program loaded from an external storage or an external controller via a connection unit in an internal memory and performs automatic operation based on the buffered machining program by an automatic operation execution unit. The machining program includes one or a plurality of buffering points, and the automatic operation execution unit includes a buffering completion checking result holding unit for checking whether a portion of the machining program to be buffered includes the buffering point and holding a result of the checking in the buffering of the portion of the machining program in the internal memory, an execution checking result holding unit for, when the automatic operation execution unit executes a portion of the machining program buffered in the internal memory, checking whether the portion of the machining program to be executed includes the buffering point and holding a result of the checking, a comparison unit for comparing the result held by the buffering completion checking result holding unit with the result held by the execution checking result holding unit, and an execution unit for performing any one of continuation, suspension, and resumption of the automatic operation based on a result of the comparison.

A diagnosis may be made for each of partial areas, which is sandwiched between two of the buffering points, of an entire area of the machining program stored in the external storage or the external controller to determine whether size of each partial area exceeds a predetermined area size of the internal memory, and information indicating the partial area, size of which exceeds the size of the internal memory, may be output as a result of the diagnosis.

The buffering point that newly divide the partial area, size of which exceeds the size of the internal memory, may be output.

Whether to perform tool retreat upon the suspension of the automatic operation may be configured to be set.

At least one of a dedicated instruction and a general instruction which does not involve cutting may be configured to be used as the buffering point.

A buffering point instruction is an instruction to specify a breakpoint for the buffering of the machining program in the internal memory. Non-cutting instructions which do not make a cutter mark even upon the suspension of the automatic operation, such as a tool retreat instruction and a fast-feed instruction, also serve as buffering point instructions, in addition to a dedicated instruction. The numerical controller makes a diagnosis in advance before start of the automatic operation to determine whether each of partial areas of the machining program that is sandwiched between buffering point instructions has a size small enough to be buffered in the internal memory of the numerical controller. The numerical controller detects a position where a direction of motion of a tool is reversed (e.g., an end face of a workpiece) from a partial area which is determined to have an invalid size as a result of the diagnosis by analyzing the machining program and newly inserts a buffering point dedicated instruction at the position.

With the above-described configuration, when the numerical controller buffers a machining program in the internal memory through data transfer from a host or readout from an auxiliary storage, the numerical controller can perform operation after completion of buffering of a portion of a machining program between buffering point instructions and, if buffering is uncompleted, suspends the operation and retreat a tool according to settings. For this reason, even if data transfer is slow and the internal memory becomes empty, machining does not stop at a point other than a buffering point instruction specified in advance, and the problem of a cutter mark on a workpiece or vibration does not occur.

A diagnosis is made in advance about an insertion position for a buffering point instruction, and a buffering point instruction is automatically inserted at a problematic point through analysis of a machining program. A worker can create a long program without regard to the presence of a buffering point instruction at the time of machining program creation.

BRIEF DESCRIPTION OF THE DRAWINGS

The above and other objects and features of the present invention will be apparent from the following description of embodiments with reference to the appended drawings, in which.

DETAILED DESCRIPTION OF THE PREFERRED EMBODIMENTS

Figure 1:
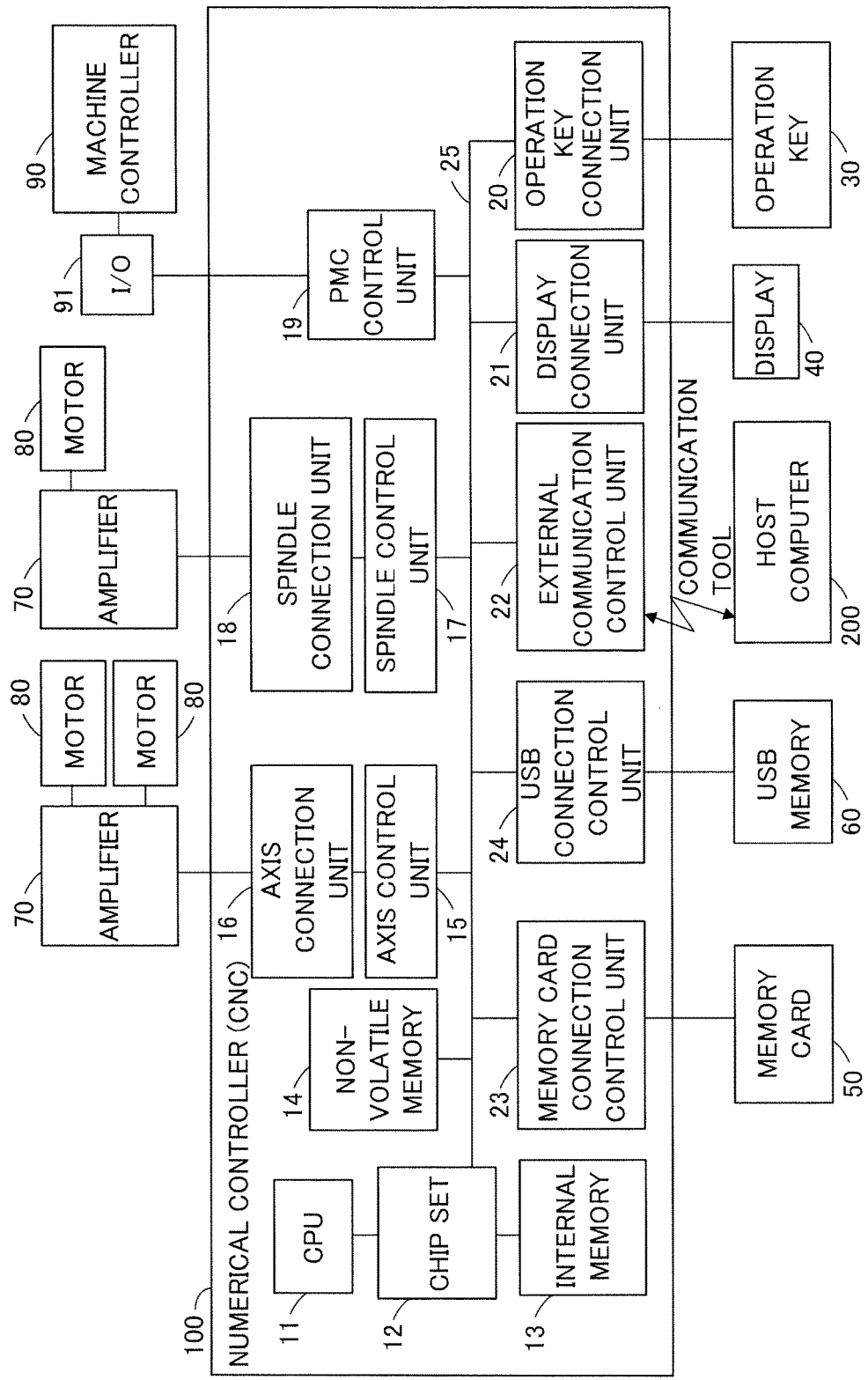
FIG. 1 is a main portion block diagram of a numerical controller according to an embodiment of the present invention.

Components identical or similar to those in a prior art technique will be described below using same reference numerals.

First Embodiment

FIG. 1 shows, by a block diagram, a peripheral configuration including a numerical controller 100 according to an embodiment of the present invention, a host computer 200, and auxiliary storages 300 (a memory card 50 and a USB memory 60 in this embodiment).

As shown in FIG. 1, the numerical controller 100 that numerically controls axes of a machine tool has a normal hardware configuration and includes a CPU 11 which controls the whole of the numerical controller 100 and a chip set for the CPU 11, an internal memory 13 which is connected to the CPU 11 via the chip set 12 and an internal bus 25, a non-volatile memory 14, an axis control unit 15, an axis connection unit 16, a spindle control unit 17, a spindle connection unit 18, a programmable machine controller (PMC) control unit 19, an operation key connection unit 20, a display connection unit 21, an external communication control unit 22, and auxiliary storage connection units (a memory card connection control unit 23 and a USB connection control unit 24 in this embodiment).

An operation key 30 (a keyboard) for an operator to perform a manual operation is connected to the operation key connection unit 20, and a display 40 is connected to the display connection unit 21. Storage media (the memory card 50 and the USB memory 60 in this embodiment) are connected to the auxiliary storage connection units and are used to transmit and receive a program, a parameter, and the like. The host computer 200 is connected to the external communication control unit 22 via a communication tool and is used to communicate a program and other data, like the storage media. An operation software program for the numerical controller 100 is stored in the non-volatile memory 14. The CPU 11 is used to load the operation software program from the non-volatile memory 14 (performs a boot operation) upon boot-up after power-on.

Besides the program, a machining program, various types of setting data, and the like are stored in the non-volatile memory 14. Automatic operation that uses neither an auxiliary storage nor external communication is performed after the machining program stored in the non-volatile memory 14 is read out into a machining program storage area of the internal memory 13 at a time.

A machine tool has a normal configuration. The machine tool includes amplifiers 70 and motors 80 corresponding to the number of axes (2 in this embodiment) and the number of spindles (1 in this embodiment) and also includes a machine controller 90 and an input/output device 91 (an I/O) which connects the PMC control unit 19 and the machine controller 90.

Figures 2, 3:
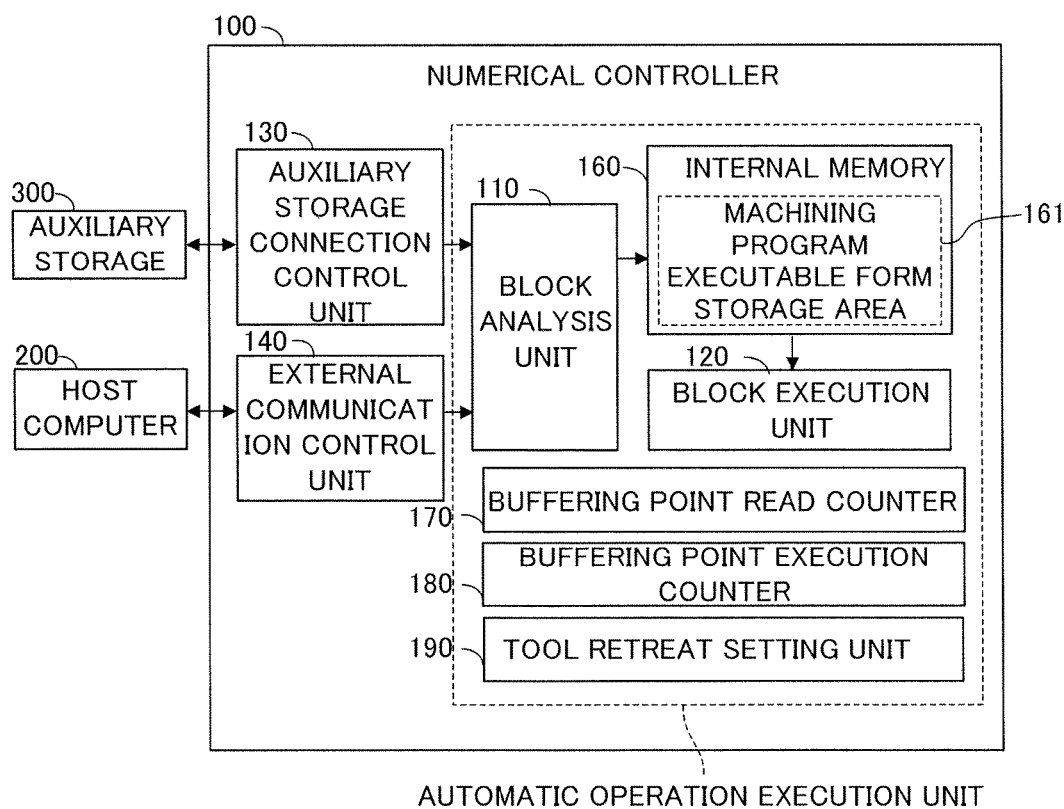
FIG. 2 is a functional block diagram of a numerical controller according to a first embodiment of the present invention.
FIG. 3 is a view showing an example of a machining program to be used in an embodiment of the present invention.

FIG. 2 is a block diagram showing processing of a machining program of the numerical controller 100 according to the embodiment of the present invention. An automatic operation execution unit is composed of a block analysis unit 110, a block execution unit 120, and an internal memory 160. A buffering point read counter 170 which indicates the number of times a buffering point instruction is stored in the internal memory 160, a buffering point execution counter 180 which indicates the number of times a buffering point instruction is executed, and a tool retreat setting unit 190 in which setting information including whether to permit tool retreat, a tool retreat direction, and a tool retreat amount is saved are also included in the automatic operation execution unit.

The block analysis unit 110 first reads out one or a plurality of blocks of a machining program from the auxiliary storage 300 or the host computer 200 through an auxiliary storage connection control unit 130 or an external communication control unit 140. The block analysis unit 110 then analyzes the read-out block(s) of the machining program (an analysis process) and stores a result of the analysis as a piece of data in executable form in a machining program executable form storage area 161 (buffering). The machining program executable form storage area 161 is a first-in, first-out (FIFO) buffer, and pieces of data in executable form are sequentially passed to the block execution unit 120 in order from one stored earliest. The block execution unit 120 executes block analysis results as pieces of data in executable form in order from one stored earliest in the machining program executable form storage area 161 (an execution process). In order to smoothly give a command for an axis or a spindle during automatic operation, the execution process is generally executed at predetermined intervals.

The analysis process may be performed a predetermined number of times at predetermined intervals or may be performed between opportunities for the execution process.

In either case, the analysis process and the execution process are not sequentially performed but are performed in parallel.

FIG. 3 is an example of a machining program used in the numerical controller 100 according to the embodiment of the present invention. The word O0001 in a first line represents a program number while the word M30 in a last line represents a program end. Lines between O0001 and M30 are called blocks, and commands to be given to the numerical controller 100, such as a tool or spindle operation command, a tool setting, and various correction functions, are written in the blocks. In each block, a sequence number (N001 to N020 in FIG. 3) for block identification is written at the beginning. A G-code (G00 or G01 in FIG. 3) representing a preparatory function for telling an axis movement method or any other setting to the numerical controller 100 and dimension words (X and Z in FIG. 3) which are commands associated with coordinate values corresponding to the G-code are written after the sequence number.

Instructions for preparatory functions include an instruction which stays in effect until the instruction is replaced (a modal command). If a command is not replaced with another one, the command itself may be omitted as in the block for N013. In the example, a miscellaneous function (M in FIG. 3) used to, e.g., call a macro or a subprogram or index a rotation axis is written. A spindle-speed function (S function) representing a command to a spindle, a tool function (T function) representing a tool setting, or the like is also written in a block (not shown). In the example in FIG. 3, M1000 that is written at the ends of blocks for the sequence numbers N011 and N020 is a miscellaneous instruction representing a buffering point introduced in the present invention.

Figure 4:
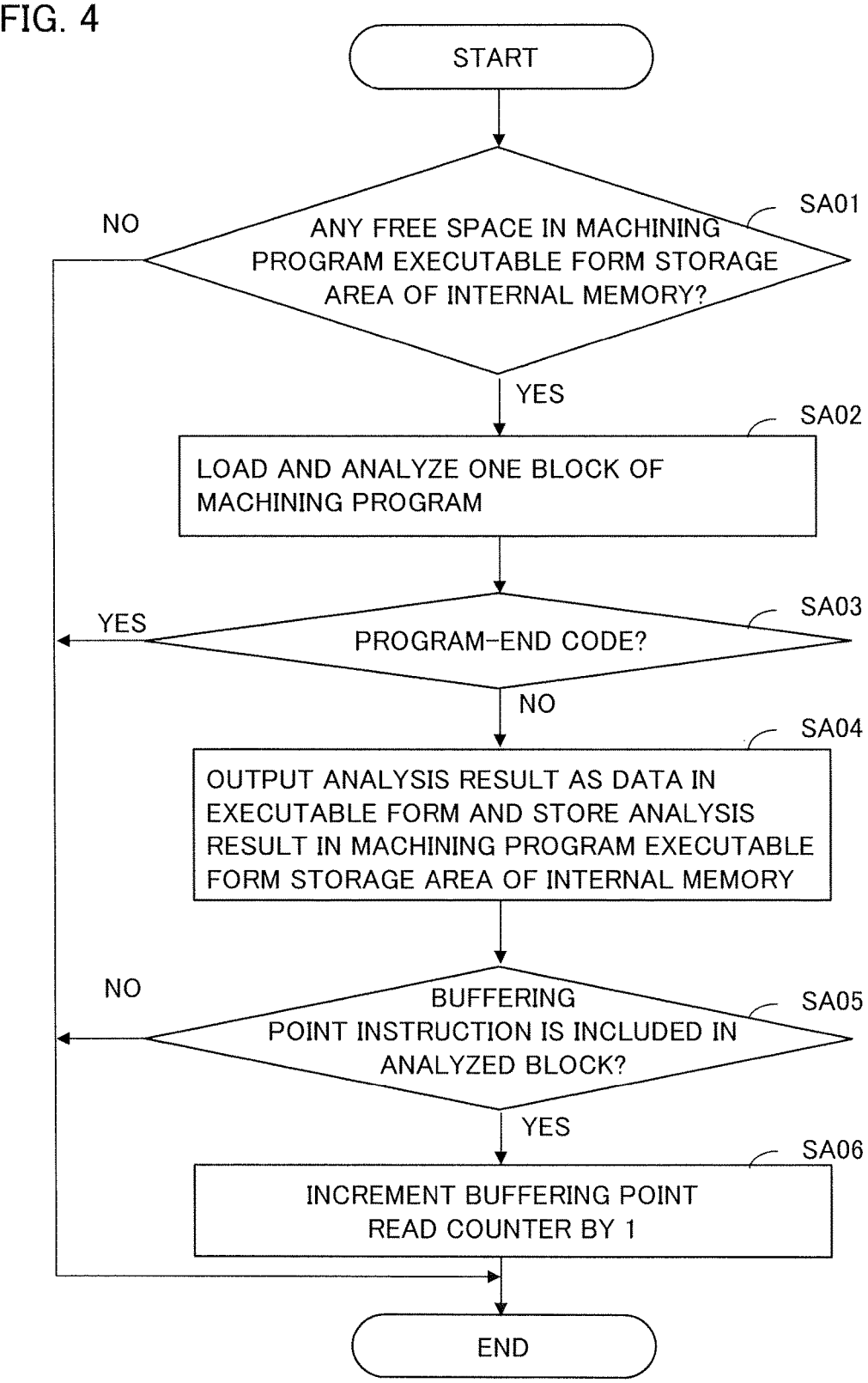
FIG. 4 is a flowchart of an analysis process according to the first embodiment of the present invention.

FIG. 4 is a flowchart showing a flow when the analysis process is performed once. As described earlier, the analysis process is performed a predetermined number of times at predetermined intervals or is started in spare time between opportunities for the execution processes.

It is first checked whether there is any free space in the machining program executable form storage area 161 of the internal memory 160 (step SA01). If there is no free space, the analysis process ends. On the other hand, if there is any free space, one block of a machining program is loaded from the auxiliary storage 300 or the host computer 200 and is analyzed (step SA02). If the analyzed block includes a program-end code (step SA03), the analysis process ends. On the other hand, if the analyzed block does not include a program-end code, a result of the analysis is output as a piece of data in executable form and is stored in the machining program executable form storage area 161 (step SA04). Finally, it is checked whether the analyzed block includes a buffering point instruction (step SA05). If the analyzed block does not include a buffering point instruction, the analysis process ends. On the other hand, if the analyzed block includes a buffering point instruction, the buffering point read counter 170 is incremented (step SA06).

The buffering point read counter 170 is reset at the start of automatic operation. Since a value of the buffering point read counter 170 is incremented each time a buffering point instruction is read out, the number of times a block including a buffering point instruction is read out from the auxiliary storage 300 or the host computer 200 is recorded in the buffering point read counter 170. That is, the buffering point read counter 170 indicates the ordinal position of a block including a latest buffering point instruction from the beginning of the machining program in a portion of the machining program stored in the machining program executable form storage area 161 of the internal memory 160.

Figure 5:
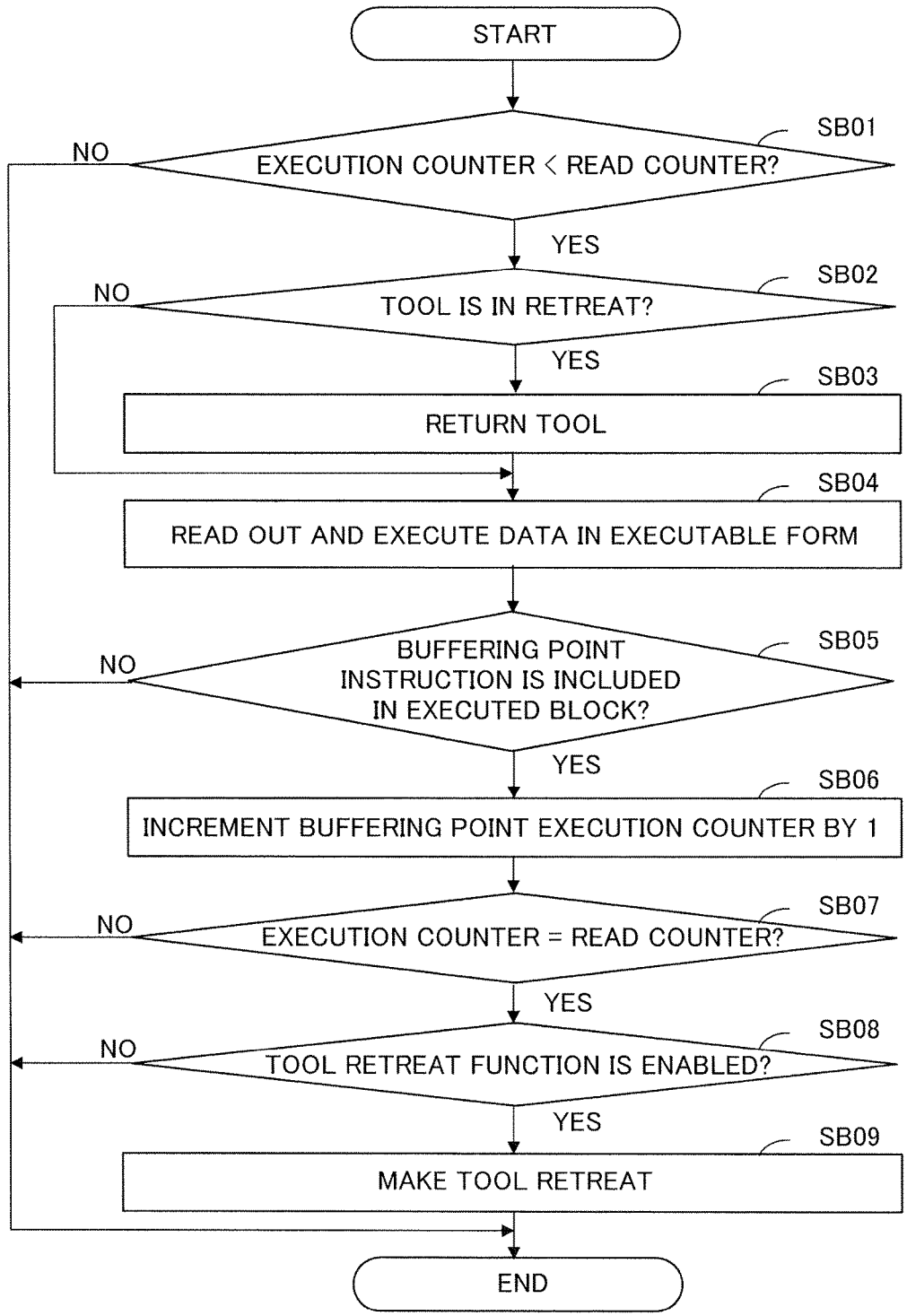
FIG. 5 is a flowchart of an execution process according to the first embodiment of the present invention.

FIG. 5 is a flowchart showing a flow when the execution process is performed once.

A value of the buffering point execution counter 180 is first compared with the value of the buffering point read counter 170 (step SB01). If the value of the buffering point execution counter 180 is not less than that of the buffering point read counter 170, the execution process ends. On the other hand, if the value of the buffering point read counter 170 is larger, it is checked whether a tool is in retreat (step SB02). If the tool is in retreat, the tool is returned (step SB03). The block execution unit 120 then reads out a piece of data in executable form in order from one stored earliest in the machining program executable form storage area 161 and executes the piece of data (step SB04). If the read-out piece of data in executable form does not include a buffering point instruction (step SB05), the read-out piece of data in executable form is executed as normal, and the execution process ends once.

On the other hand, if the read-out piece of data in executable form includes a buffering point instruction, the buffering point execution counter 180 is first incremented (step SB06). The buffering point execution counter 180 is compared with the buffering point read counter 170 again (step SB07). With this comparison, it is possible to check whether a buffering point instruction immediately succeeding a currently executed buffering point instruction is already buffered. If a result of the comparison shows that the value of the buffering point execution counter 180 is equal to that of the buffering point read counter 170, settings in the tool retreat setting unit 190 are checked (step SB08). If a tool retreat function is enabled, the tool is made to retreat in a set retreat direction by a set retreat amount (step SB09), and the execution process ends. On the other hand, if the retreat function is not enabled, the execution process ends without execution of tool retreat.

Note that the settings including whether to enable the tool retreat function, the tool retreat amount, and the tool retreat direction can be set in the tool retreat setting unit 190 in advance before automatic operation and that even an instruction in a machining program can be changed at any time during automatic operation.

Figure 6:
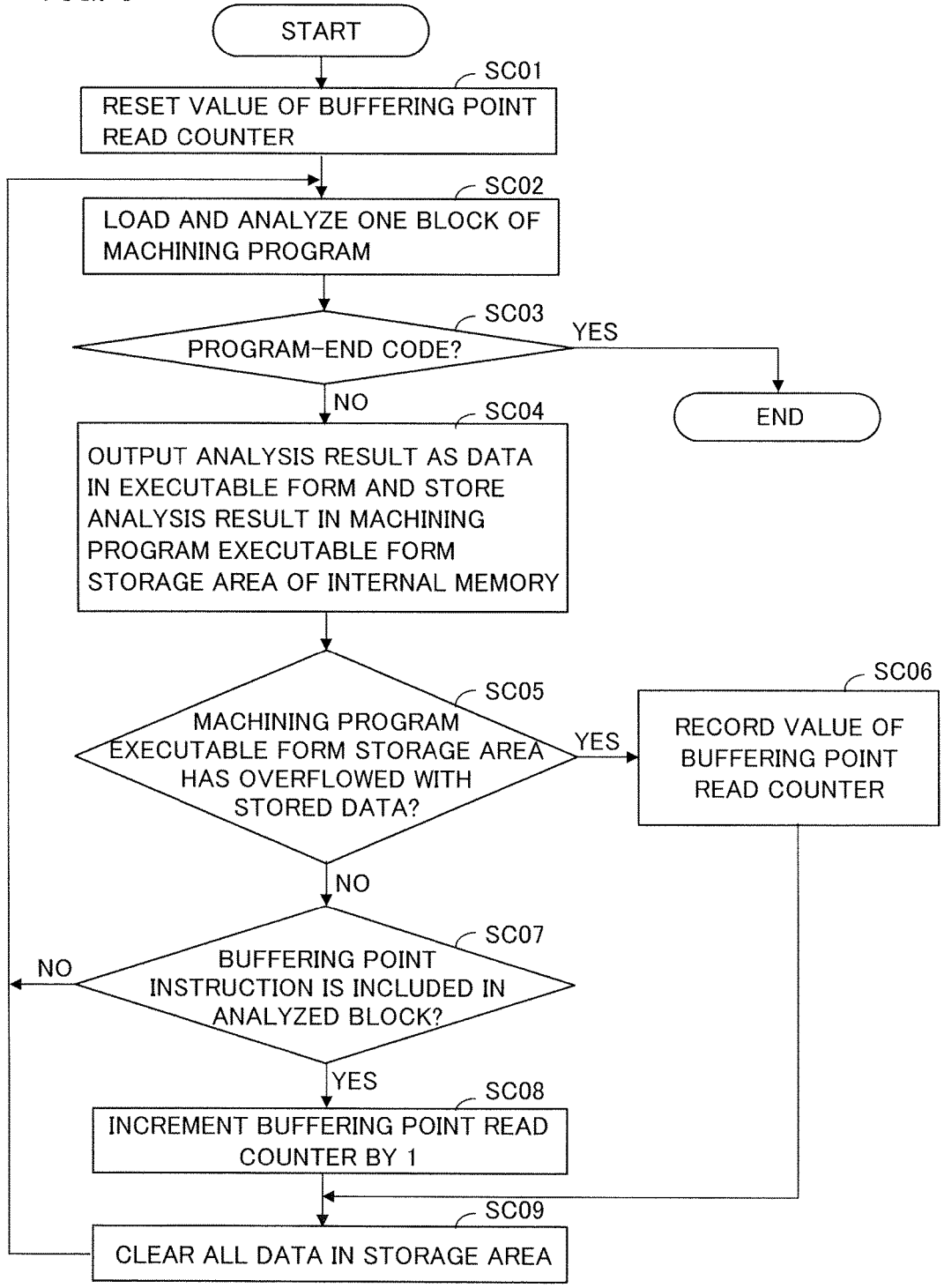
FIG. 6 is a flowchart of a diagnosis process according to the first embodiment of the present invention.

FIG. 6 is a flowchart showing a flow of a diagnosis process of making a diagnosis to determine whether buffering points are inserted in a machining program stored in the auxiliary storage 300 or the host computer 200 at appropriate intervals.

The value of the buffering point read counter 170 is first reset (step SC01). One block of a machining program is then loaded from the auxiliary storage 300 or the host computer 200 and is analyzed (step SC02). If the loaded block includes a program-end code (step SC03), the diagnosis process ends. On the other hand, if the loaded block does not include a program-end code, a result of the analysis is output as a piece of data in executable form and is stored in the machining program executable form storage area 161 of the internal memory 160 (step SC04).

It is checked whether the machining program executable form storage area 161 has overflowed with a stored piece (stored pieces) of data (step SC05). If the machining program executable form storage area 161 has overflowed, a current value of the buffering point read counter 170 is recorded (step SC06). On the other hand, if the machining program executable form storage area 161 has not overflowed, it is checked whether the analyzed block includes a buffering point instruction (step SC07). If the analyzed block does not include a buffering point instruction, same processing starting from machining block loading is performed again. On the other hand, if the analyzed block includes a buffering point instruction, the value of the buffering point read counter 170 is incremented (step SC08), all of the pieces of data in executable form stored in the machining program executable form storage area 161 are cleared (step SC09), and same processing starting from machining block loading is performed again.

If the machining program executable form storage area 161 has overflowed in step SC05, all of the pieces of data stored in the machining program executable form storage area 161 are also cleared (step SC09), and same processing starting from machining block loading is performed again.

By repeating the above-described flow, the position of a latest buffering point instruction is recorded as a value of the buffering point read counter 170 each time there are too many blocks between buffering point instructions to fit into the machining program executable form storage area 161 of the internal memory 160. After execution of the process, the numerical controller 100 can output recorded values of the buffering point read counter 170 to a user to notify the user of a point of failure to fit into the machining program executable form storage area 161.

Note that the diagnosis process can also be performed while a threshold associated with the checking of whether the machining program executable form storage area 161 has overflowed is set to be smaller than an actual storage area size.

Figure 7:
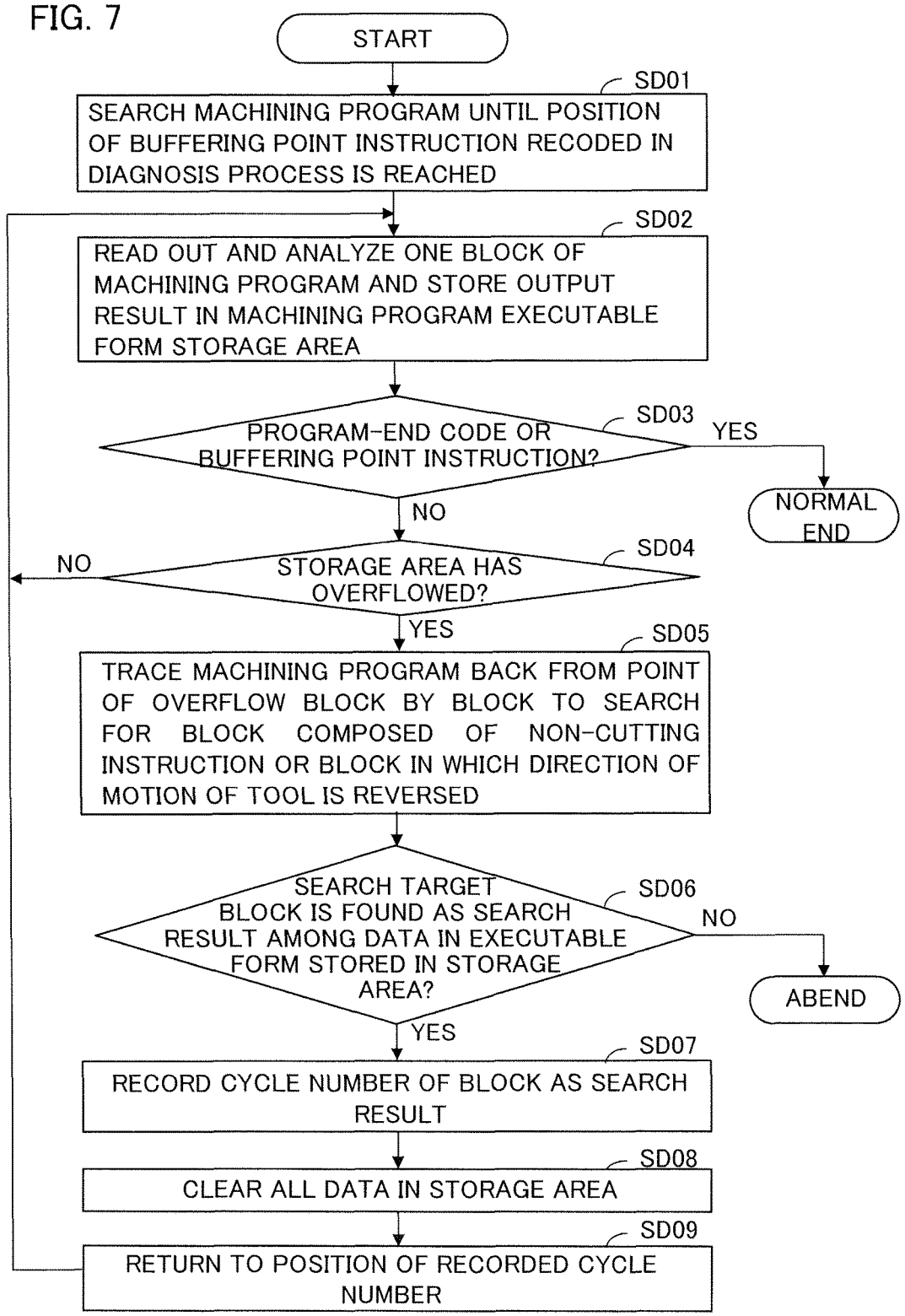
FIG. 7 is a flowchart of a buffering point instruction insertion position output process according to the first embodiment of the present invention.

FIG. 7 is a flowchart showing a flow of a process of outputting the position of a buffering point instruction to be newly added for a point of failure to fit into the machining program executable form storage area 161 of the internal memory 160 which is obtained during the execution of the diagnosis process in FIG. 6.

A machining program is searched until the position of a buffering point instruction recorded in the diagnosis process described earlier is reached (step SD01). Starting from the position, machining program loading and analysis and storage in the machining program executable form storage area 161 are repeated until the machining program executable form storage area 161 overflows (step SD02). If a program-end code or a buffering point instruction is read out during the repetition of the process in step SD02 (step SD03), the process ends normally. If the machining program executable form storage area 161 overflows during the repetition (step SD04), the machining program is traced back from a point of overflow block by block to search for a block which is composed of a non-cutting instruction, such as a fast-feed instruction, or a block in which a direction of motion of the tool is reversed (step SD05). If a block meeting search criteria is found as a result of the search before an immediately preceding buffering point instruction or the beginning of the machining program (step SD06), a cycle number at the position of the found block is recorded (step SD07), all of a piece (pieces) of data in the machining program executable form storage area 161 is (are) cleared (step SD08). A return to the position of the cycle number recorded in step SD07 is made (step SD09), and same processing is repeated from the position again.

With the above-described processing repetition, it is possible to cope with a case where an area after a detected buffering point insertion position fails to fit into the machining program executable form storage area 161. Note that if a block composed of a non-cutting instruction, such as a fast-feed instruction, or a block in which the direction of motion of the tool is reversed is not found in step SD06, the process abends.

The above-described process allows outputting of a position at which a buffering point is to be added for an area including a machining block overflowing the machining program executable form storage area 161 and notification of the position to a user. By executing such processing for each of points of failure to fit into the machining program executable form storage area 161 in the diagnosis process described earlier, a user can be notified of points at which buffering points are to be inserted across the entire area of the machining program. Note that, at the time of notifying the user, whether to actually insert the new buffering points is confirmed. If the user allows insertion, the new buffering points are automatically inserted at the corresponding points of the machining program. It is also possible to make settings in advance so as to automatically insert a buffering point instruction without notification to a user.

Non-cutting instructions which do not make a cutter mark even upon suspension of automatic operation, such as a tool retreat instruction and a fast-feed instruction, also serve as buffering point instructions, in addition to a dedicated instruction. Whether to treat an arbitrary instruction specified by a user as a buffering point instruction can also be set in advance.

Note that, in the present embodiment, the automatic operation execution unit has the buffering point read counter 170 and the buffering point execution counter 180. It is also possible to implement the present invention by substituting one buffering point counter for the two counters, incrementing the counter by 1 after a buffering point instruction is stored in the machining program executable form storage area 161, decrementing the counter by 1 after a buffering point instruction is executed by the block execution unit 120, and suspending automatic operation by the block execution unit 120 when the counter becomes 0.

Second Embodiment

The first embodiment has illustrated an embodiment of the numerical controller 100 that is configured to store a result of analysis from the block analysis unit 110 in the machining program executable form storage area 161 of the internal memory 160, as shown in FIG. 2. A second embodiment will describe an example associated with a numerical controller 100 which stores a machining program in a machining program storage area 162 of an internal memory 160 before a block analysis unit 110.

Note that an example of a machining program to be used is the same as that in FIG. 3. The numerical controller 100 and a peripheral configuration are the same as those in FIG. 1.

Figure 8:
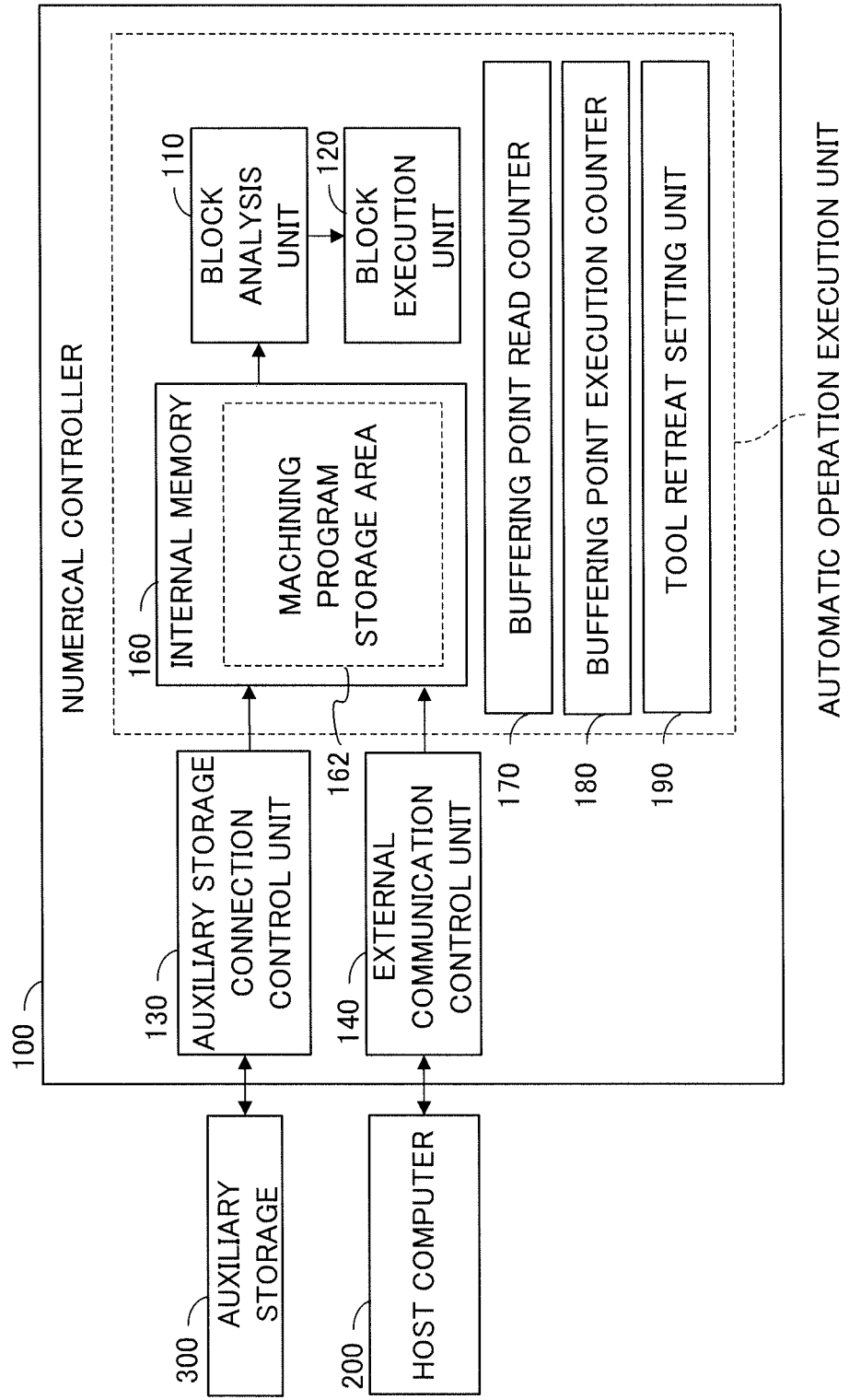
FIG. 8 is a functional block diagram of a numerical controller according to a second embodiment of the present invention.

FIG. 8 is a block diagram showing processing of a machining program by the numerical controller 100 according to the present embodiment.

Unlike FIG. 2, a machining program read out from an auxiliary storage 300 or a host computer 200 is first stored in the machining program storage area 162 of the internal memory 160 (a readout process and buffering). The stored machining program is passed to the block analysis unit 110. The block analysis unit 110 outputs a result of analysis as a piece of data in block executable form and passes the piece of data in block executable form to a block execution unit 120 (an analysis process). The block execution unit 120 executes the passed piece of data in block executable form (an execution process).

Like the first embodiment, the execution process is executed at predetermined intervals. The analysis process is executed at predetermined intervals, like the execution process, and is executed so as to correspond to the execution process. The readout process may be performed a predetermined number of times at predetermined intervals or may be performed between opportunities for the execution process and the analysis process. In either case, the analysis process and execution process and the readout process are not sequentially performed but are performed in parallel.

Figure 9:
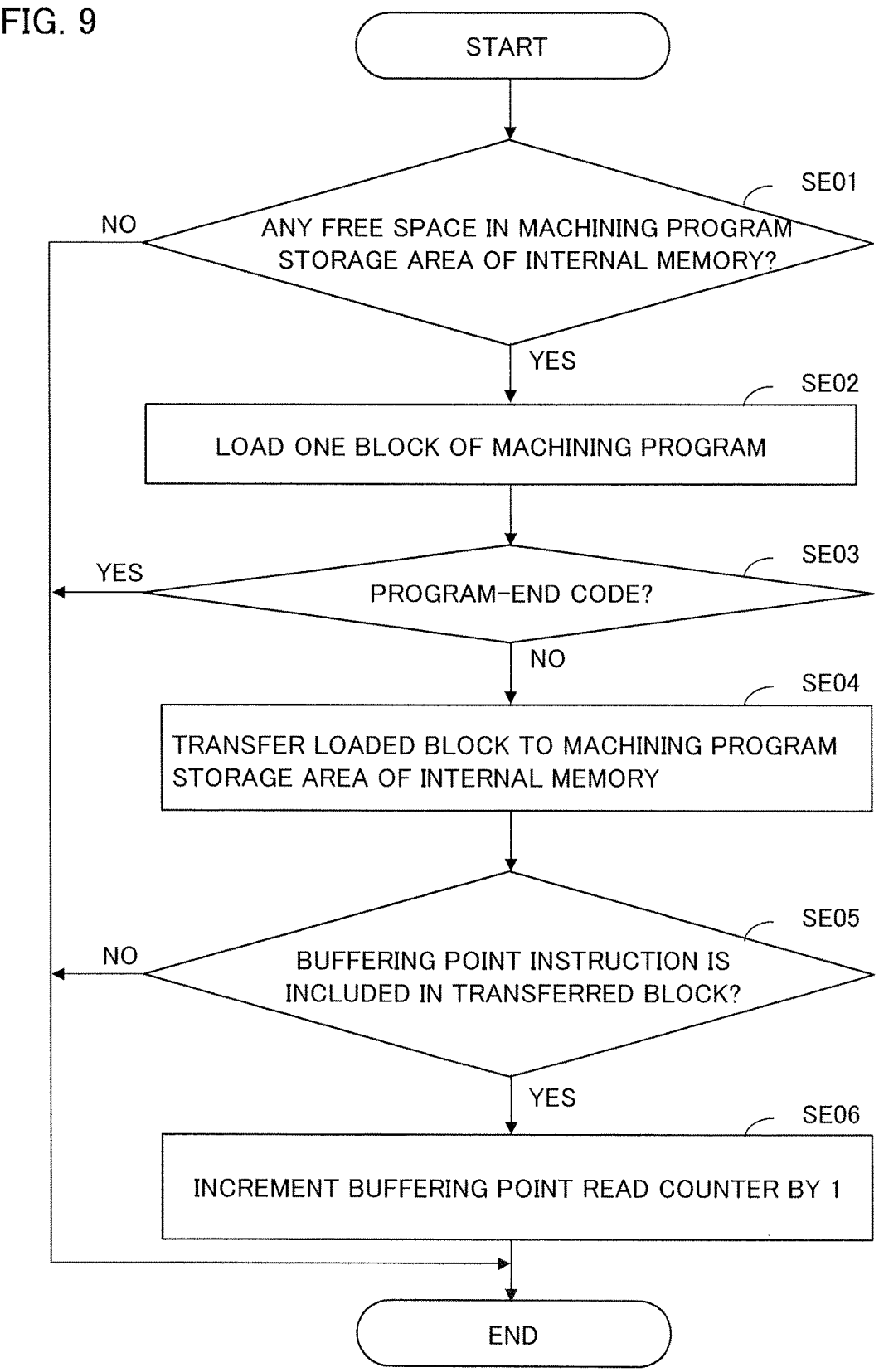
FIG. 9 is a flowchart of an analysis process according to the second embodiment of the present invention.

FIG. 9 is a flowchart showing a flow when the readout process is performed once. As described earlier, the readout process is performed a predetermined number of times at predetermined intervals or is started in spare time between opportunities for the execution process and the analysis process.

It is first checked whether there is any free space in the machining program storage area 162 of the internal memory 160 (step SE01). If there is no free space, the readout process ends. On the other hand, if there is any free space, a block of a machining program is loaded from the auxiliary storage 300 or the host computer 200 (step SE02). If the loaded block includes a program-end code (step SE03), the analysis process ends. On the other hand, the loaded block does not include a program-end code, the loaded block is stored in the machining program storage area 162 of the internal memory 160 (step SE04). Finally, it is checked whether the loaded block includes a buffering point instruction (step SE05). If the loaded block does not include a buffering point instruction, the readout process ends. On the other hand, if the loaded block includes a buffering point instruction, a buffering point read counter 170 is incremented (step SE06).

The buffering point read counter 170 is reset at the start of automatic operation Like the first embodiment, the buffering point read counter 170 indicates the ordinal position of a block including a latest buffering point instruction from the beginning of the machining program in a portion of the machining program stored in the internal memory 160.

Figure 10:
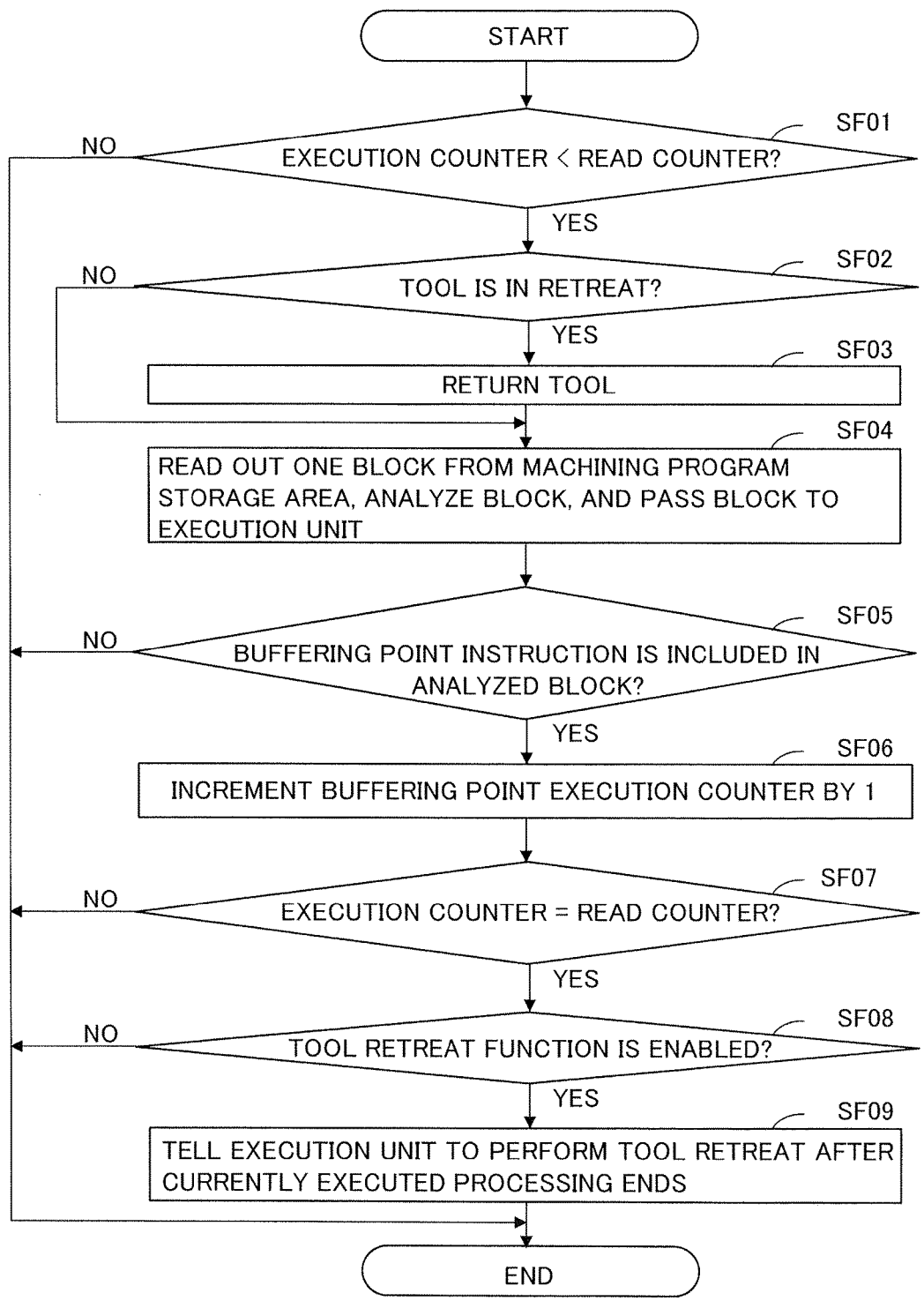
FIG. 10 is a flowchart of an execution process according to the second embodiment of the present invention.

FIG. 10 is a flowchart showing a flow when the execution process is performed once.

A value of a buffering point execution counter 180 is first compared with a value of the buffering point read counter 170 (step SF01). If the value of the buffering point execution counter 180 is not less than that of the buffering point read counter 170, the execution process ends. On the other hand, if the value of the buffering point read counter 170 is larger, it is checked whether a tool is in retreat (step SF02). If the tool is in retreat, the tool is returned (step SF03). The block analysis unit 110 then reads out blocks from the machining program storage area 162 in order from one stored earliest, analyzes each block, and passes a command as a result of the analysis to the block execution unit 120 (step SF04). If the analyzed block does not include a buffering point instruction (step SF05), the analyzed block is executed as normal, and the execution process ends once.

On the other hand, if the analyzed block includes a buffering point instruction, the buffering point execution counter 180 is first incremented (step SF06). The buffering point execution counter 180 is compared with the buffering point read counter 170 again (step SF07). With this comparison, it is possible to check whether a buffering point instruction immediately succeeding a currently executed buffering point instruction is already buffered. If a result of the comparison shows that the value of the buffering point execution counter 180 is equal to that of the buffering point read counter 170, settings in a tool retreat setting unit 190 are checked (step SF08). If a tool retreat function is enabled, the tool is made to retreat in a set retreat direction by a set retreat amount after currently executed processing ends (step SF09), and the execution process ends. On the other hand, if the retreat function is not enabled, the execution process ends without execution of tool retreat.

Figure 11:
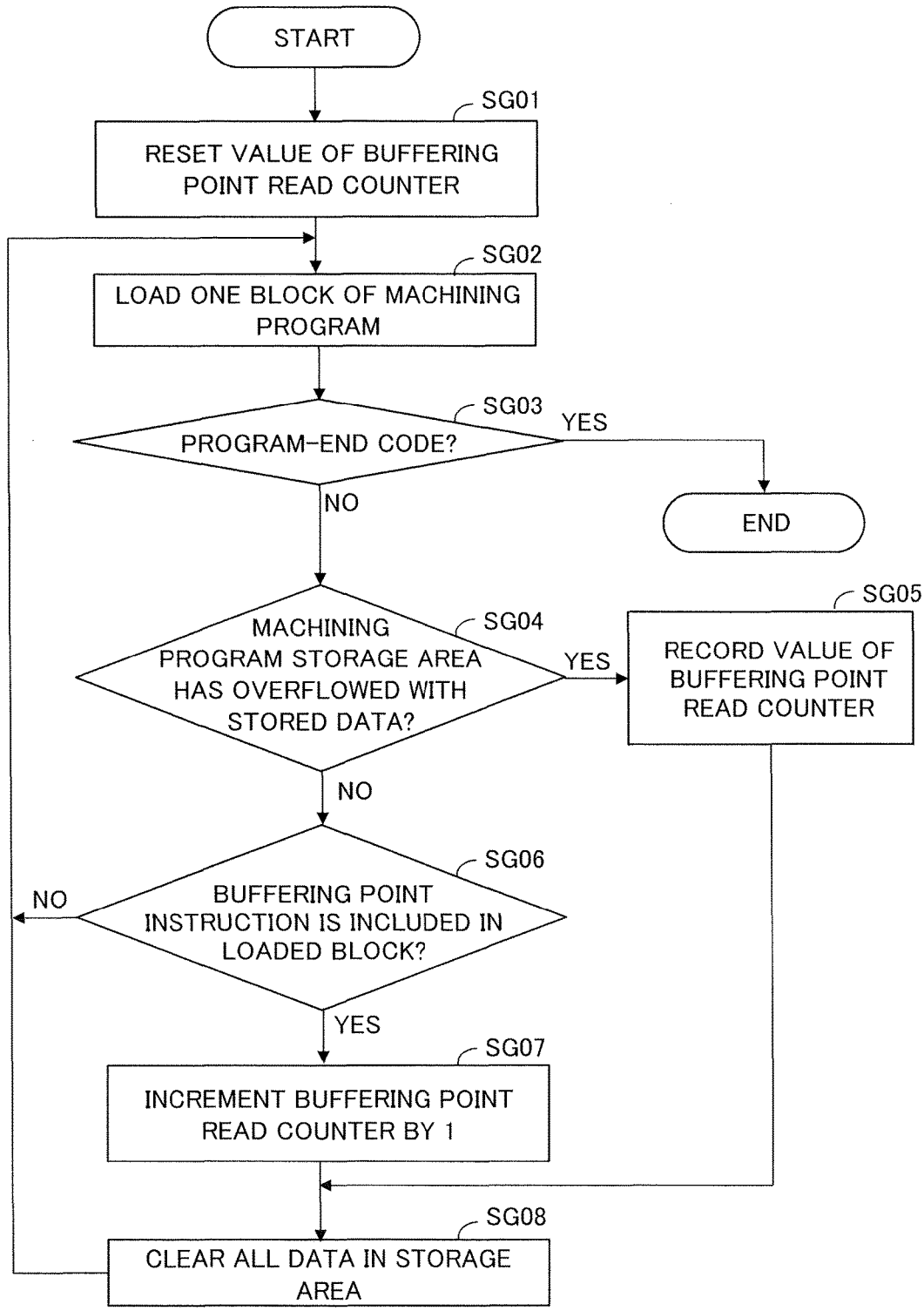
FIG. 11 is a flowchart of a diagnosis process according to the second embodiment of the present invention.

FIG. 11 is a flowchart showing a flow of a diagnosis process of making a diagnosis to determine whether buffering points are inserted in a machining program stored in the auxiliary storage 300 or the host computer 200 at appropriate intervals.

The value of the buffering point read counter 170 is first reset (step SG01). One block of a machining program is then loaded from the auxiliary storage 300 or the host computer 200 (step SG02). If the loaded block includes a program-end code (step SG03), the diagnosis process ends. On the other hand, if the loaded block does not include a program-end code, it is checked whether the machining program storage area 162 has overflowed with a stored piece (stored pieces) of data (step SG04). If the machining program storage area 162 has overflowed, a current value of the buffering point read counter 170 is recorded (step SG05). On the other hand, if the machining program storage area 162 has not overflowed, it is checked whether the analyzed block includes a buffering point instruction (step SG06). If the analyzed block does not include a buffering point instruction, same processing starting from machining block loading is performed again. On the other hand, if the analyzed block includes a buffering point instruction, the value of the buffering point read counter 170 is incremented (step SG07), all of the pieces of data stored in the machining program storage area 162 are cleared (step SG08), and same processing starting from machining block loading is performed again.

If the machining program storage area 162 has overflowed in step SG04, all of the pieces of data in the machining program storage area 162 are also cleared (step SG08), and same processing starting from machining block loading is performed again.

By repeating the above-described flow, the position of a latest buffering point instruction is recorded as a value of the buffering point read counter 170 each time there are too many blocks between buffering point instructions to fit into the machining program storage area 162 of the internal memory 160. After execution of the process, the numerical controller 100 can output recorded values of the buffering point read counter 170 to a user to notify the user of a point of failure to fit into the machining program storage area 162.

Note that the diagnosis process can also be performed while a threshold associated with the checking of whether the machining program storage area 162 has overflowed is set to be smaller than an actual storage area size.

Figure 12:
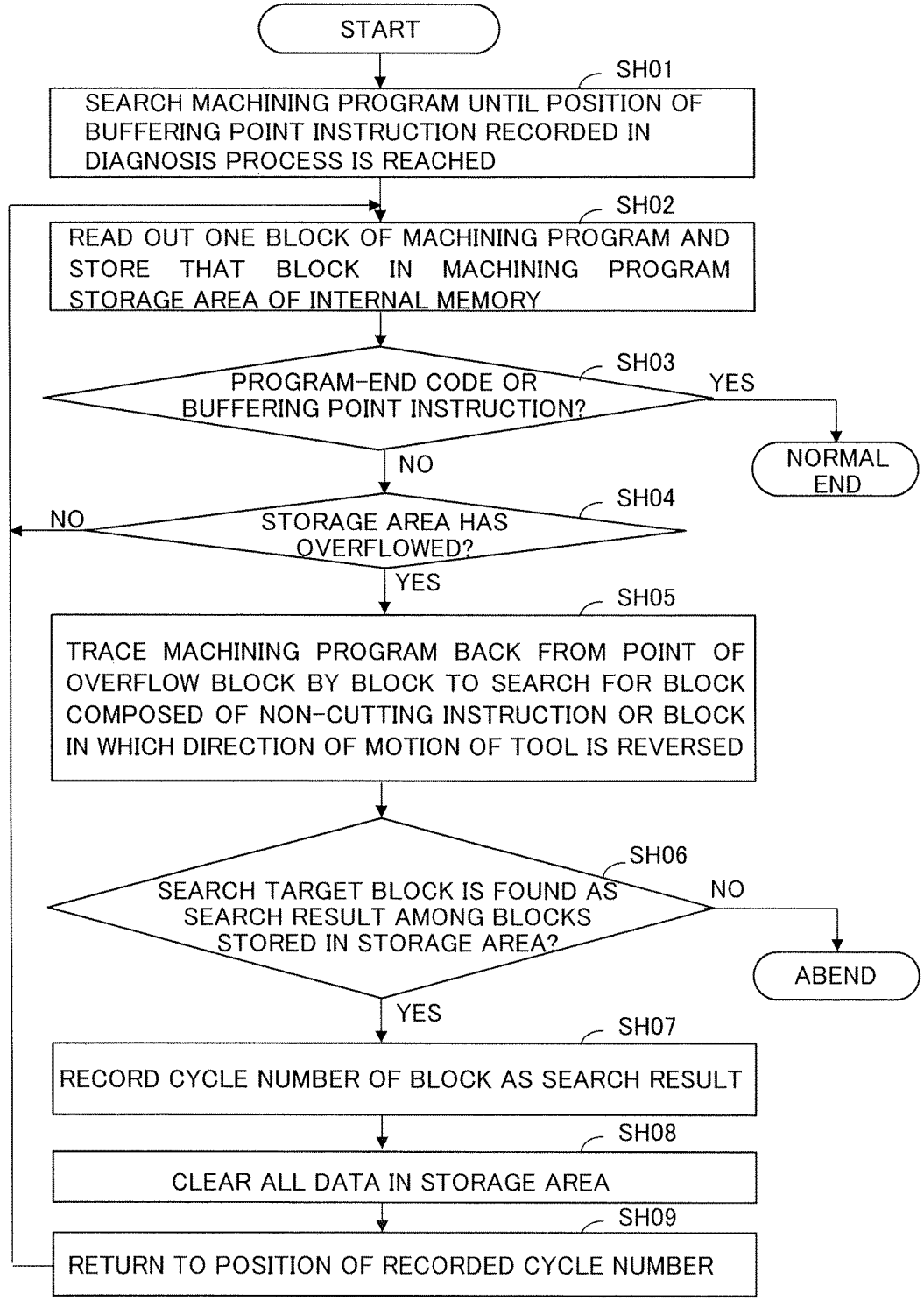
FIG. 12 is a flowchart of a buffering point instruction insertion position output process according to the second embodiment of the present invention.
Figure 13:
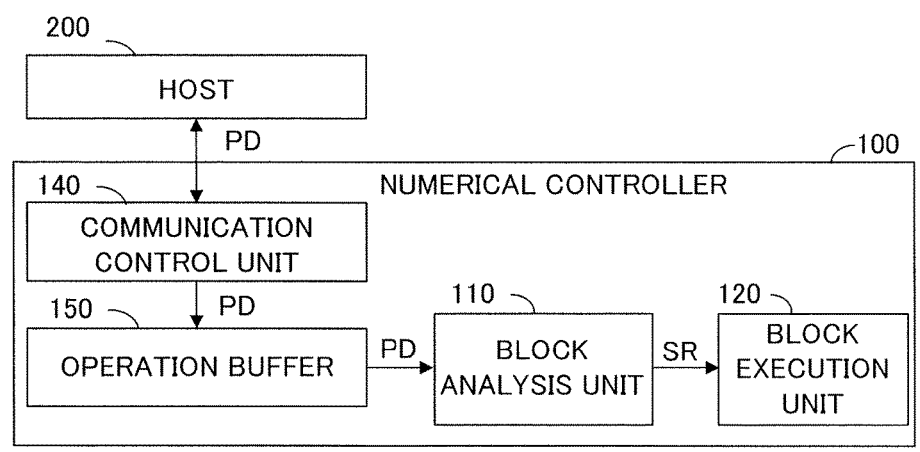
FIG. 13 is a block diagram of a numerical controller having a remote operation function via a network in a prior art technique.
Figure 14:
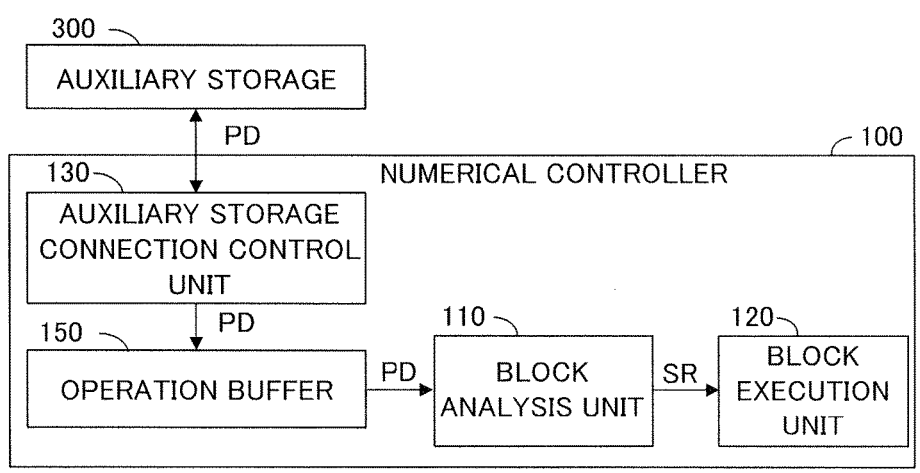
FIG. 14 is a block diagram of a numerical controller having a remote operation function using an auxiliary storage in a prior art technique.

FIG. 12 is a flowchart showing a flow of a process of outputting the position of a buffering point instruction to be newly added for a point of failure to fit into the machining program storage area 162 of the internal memory 160 which is obtained during the execution of the diagnosis process in FIG. 11.

A machining program is searched until the position of a buffering point instruction recorded in the diagnosis process described earlier is reached (step SH01). Starting from the position, machining block loading and storage in the machining program storage area 162 are repeated until the machining program storage area 162 overflows (step SH02). If a program-end code or a buffering point instruction is read out during the repetition of the process in step SH02 (step SH03), the process ends normally. If the machining program storage area 162 overflows during the repetition (step SH04), the machining program is traced back from a point of overflow block by block to search for a block which is composed of a non-cutting instruction, such as a fast-feed instruction, or a block in which a direction of motion of the tool is reversed (step SH05).

If a block meeting search criteria is found as a result of the search before an immediately preceding buffering point or the beginning of the machining program (step SH06), a cycle number at the position of the found block is recorded (step SH07), and all of a piece (pieces) of data in the machining program storage area 162 is (are) cleared (step SD08). A return to the position of the recorded cycle number is made (step SH09), and same processing is repeated from the position again. With the above-described processing repetition, it is possible to cope with a case where an area after a detected buffering point insertion position fails to fit into the machining program storage area 162. Note that if a block composed of a non-cutting instruction, such as a fast-feed instruction, or a block in which the direction of motion of the tool is reversed is not found in step SH06, the process abends.

The above-described process allows outputting of a position at which a buffering point is to be added for an area including a machining block overflowing the machining program storage area 162 and notification of the position to a user. By executing such processing for each of points of failure to fit into the machining program storage area 162 in the diagnosis process described earlier, a user can be notified of points at which buffering points are to be inserted across the entire area of the machining program. Note that, at the time of notifying the user, whether to actually insert the new buffering points is confirmed. If the user allows insertion, the new buffering points are automatically inserted at the corresponding points of the machining program. It is also possible to make settings in advance so as to automatically insert a buffering point instruction without notification to a user.

The invention claimed is:

1. A numerical controller including a direct numerical control (DNC) operation unit, the numerical controller buffering a machining program loaded from an external storage or an external controller via a connection unit in an internal memory and performing automatic operation based on the buffered machining program by an automatic operation execution unit, wherein the machining program includes one or a plurality of buffering point instructions that specify a breakpoint for the buffering of the machining program, and the automatic operation execution unit includes a buffering completion checking result holding unit for checking whether a portion of the machining program to be buffered includes the buffering point instruction and holding a result of the checking in the buffering of the portion of the machining program in the internal memory, an execution checking result holding unit for, when the automatic operation execution unit executes a portion of the machining program buffered in the internal memory, checking whether the portion of the machining program to be executed includes the buffering point instruction and holding a result of the checking, a comparison unit for comparing the result held by the buffering completion checking result holding unit with the result held by the execution checking result holding unit, and an execution unit for performing any one of continuation, suspension, and resumption of the automatic operation based on a result of the comparison, wherein, prior to performing the automatic operation based on the buffered machining program, a diagnosis is configured to be made for each of partial areas, which is sandwiched between two of the buffering point instructions, of an entire area of the machining program stored in the external storage or the external controller to determine whether a size of each partial area exceeds a predetermined area size of the internal memory.

2. The numerical controller including the DNC operation unit according to claim 1, wherein
information indicating the partial area, the size of which exceeds the predetermined area size of the internal memory, is output as a result of the diagnosis.

3. The numerical controller including the DNC operation unit according to claim 2, wherein
the buffering point instructions that newly divide the partial area, the size of which exceeds the size of the internal memory, is configured to be output.

4. The numerical controller including the DNC operation unit according to claim 1, wherein
whether to perform tool retreat upon the suspension of the automatic operation is configured to be set.

5. The numerical controller including the DNC operation unit according claim 1, wherein
at least one of a dedicated instruction and a general instruction which does not involve cutting is configured to be used as the buffering point instruction.

6. The numerical controller including the DNC operation unit according to claim 2, wherein
whether to perform tool retreat upon the suspension of the automatic operation is configured to be set.

7. The numerical controller including the DNC operation unit according to claim 3, wherein
whether to perform tool retreat upon the suspension of the automatic operation is configured to be set.

8. The numerical controller including the DNC operation unit according to claim 2, wherein
at least one of a dedicated instruction and a general instruction which does not involve cutting is configured to be used as the buffering point instruction.

9. The numerical controller including the DNC operation unit according to claim 3, wherein
at least one of a dedicated instruction and a general instruction which does not involve cutting is configured to be used as the buffering point instruction.

10. The numerical controller including the DNC operation unit according to claim 4, wherein
at least one of a dedicated instruction and a general instruction which does not involve cutting is configured to be used as the buffering point instruction.

11. The numerical controller including the DNC operation unit according to claim 6, wherein
at least one of a dedicated instruction and a general instruction which does not involve cutting is configured to be used as the buffering point instruction.

12. The numerical controller including the DNC operation unit according to claim 7, wherein
at least one of a dedicated instruction and a general instruction which does not involve cutting is configured to be used as the buffering point instruction.

13. The numerical controller including the DNC operation unit according to claim 2, wherein
for a partial area which is determined to have a size that exceeds the predetermined area size of the internal memory, a position where a direction of motion of a tool is reversed is detected from the partial area, and a new buffering point instruction is inserted at the position.

* * * * *